Dec. 2, 1941.    P. RÖHR ET AL    2,264,408
METHOD OF ASSEMBLING AND INSTALLING EQUIPMENT
Filed Nov. 23, 1938    3 Sheets-Sheet 1

Inventors:
Paul Röhr, Werner Hofmann,
Bruno Störcke, Johann Haseloff,
Franz Schrötek
by George J Baldwin
Their Attorney.

Patented Dec. 2, 1941

2,264,408

UNITED STATES PATENT OFFICE 2,264,408

METHOD OF ASSEMBLING AND INSTALLING EQUIPMENT

Paul Röhr, Werner Hofmann, Bruno Stärke, Johann Haseloff, and Franz Schröter, Dessau, Germany, assignors to Junkers Flugzeug-und-Motorenwerke Aktiengesellschaft, Dessau, Germany, a corporation of Germany Application November 23, 1938, Serial No. 241,934
In Germany November 24, 1937

1 Claim. (Cl. 72—16)

This invention relates to a method of assembling and installing equipment, such as wiring, or electrical or piping installations which are to be mounted in chambers of limited size such as many of those usually found on aircraft.

Until now it has been customary when assembling and installing such equipment in chambers of limited size, such as those found in the wings and other parts of airplanes, to take each separate part, such as wire, switches, pipe, connections and the like, into the chamber and to assemble and erect them there. It is also usual to bend and shape thinner, more delicate parts in the chamber to fit the various positions in the assembly which they are to occupy prior to securing them in place. Many chambers on aircraft where such equipment must be installed are so small that only one man can work therein at a time, and he must work under difficulties and in cramped quarters, with the result that only very slow progress is made, and the cost of such installations is often quite excessive.

It is an object of the invention to provide a method of assembling and installing equipment in a relatively small chamber so that the work can be more quickly and economically performed, and consists of a method whereby the various parts are assembled outside the chamber and rigidly secured in their required spaced relation to one another, and the assembly is then transported into the chamber and mounted in position.

Another object of the invention is to provide a method of assembling and installing equipment in a relatively small chamber consisting of utilizing a fixture, or construction frame, outside the chamber, detachably supporting carrier means on the fixture, and securing the various parts of the equipment in their required spaced relation to one another to the carrier means to form a rigid unit, and, after detaching the unit from the fixture, transporting the unit into the chamber and securing it therein in its desired position. This method is applicable both to assemblies of strong, rigid parts, such as pipes, which will form a rigid unit with the carrier means if the latter only consist of one or a plurality of separate spacing members to each of which at least some of the parts are secured, after removal of the unit from the fixture; or in the event that some of the parts at least are too weak to retain the unit in shape as a rigid entity after its removal from the fixture, the carrier means may consist of a continuous rigid conduit upon or within which the various parts are secured.

Having thus briefly described some of the objects and advantages of the invention, we will now proceed to describe two preferred ways in which it may be employed with the aid of the accompanying drawings, in which.

Figure 1:
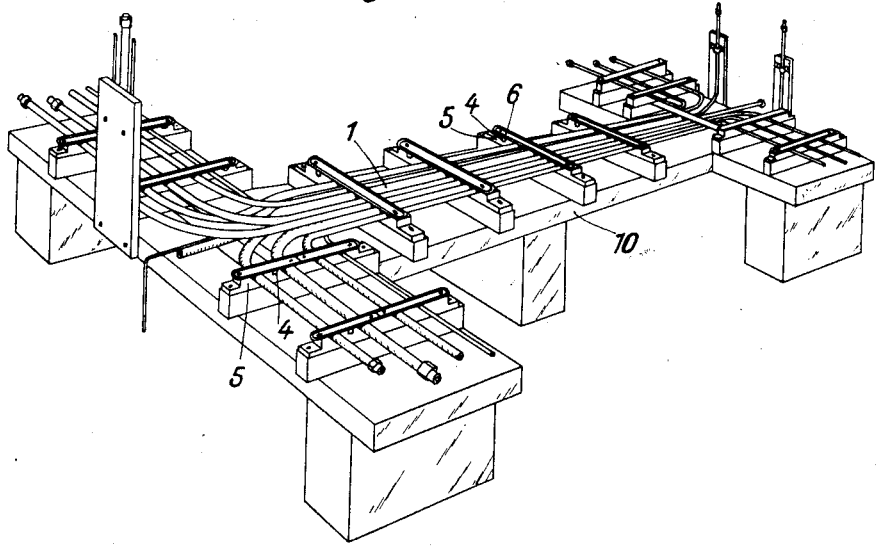
Figure 1 illustrates a perspective view of a fixture whereon the carrier means consists of separate spacing members, and some at least of the parts are secured to each spacing member.
Figure 2:
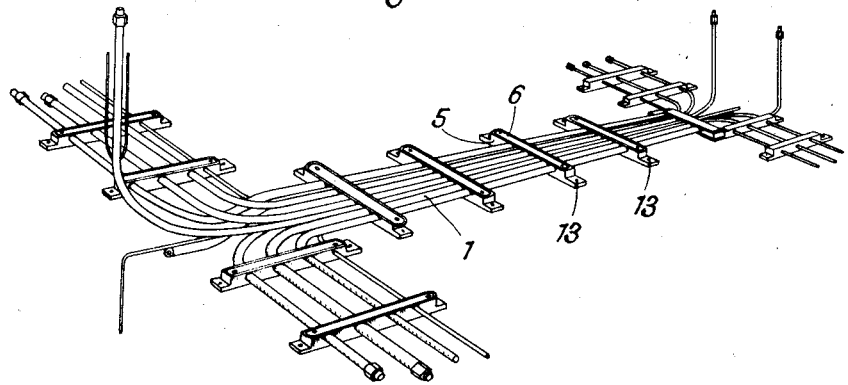
Figure 2 is a perspective view of the assembly shown in Figure 1 after its removal from the fixture.
Figure 3:
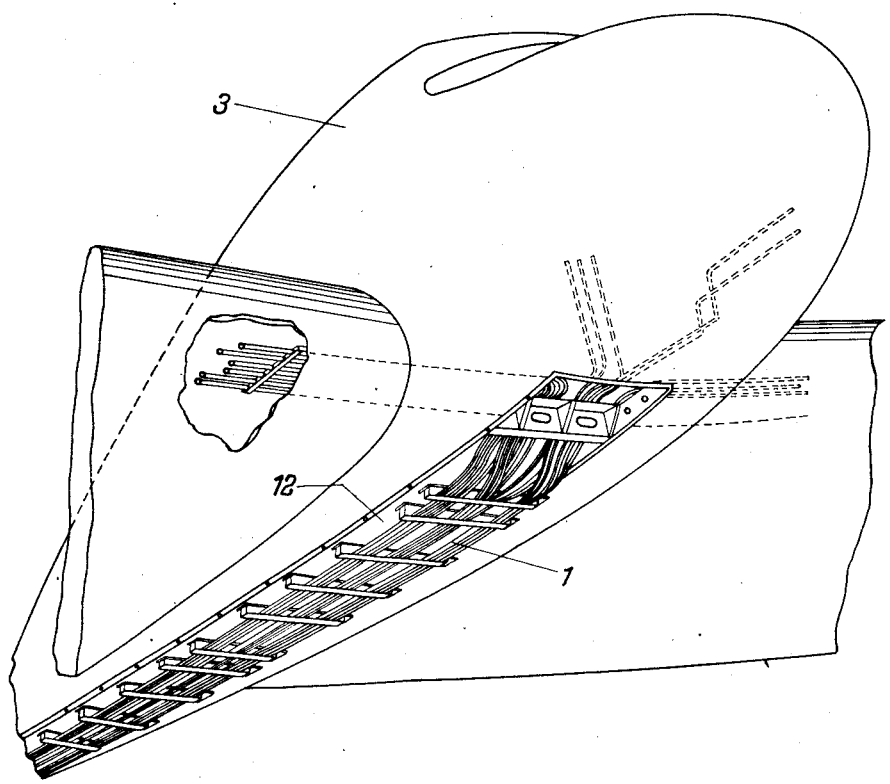
Figure 3 is a perspective view of the same assembly secured in position in a relatively small chamber in an airplane.
Figure 4:
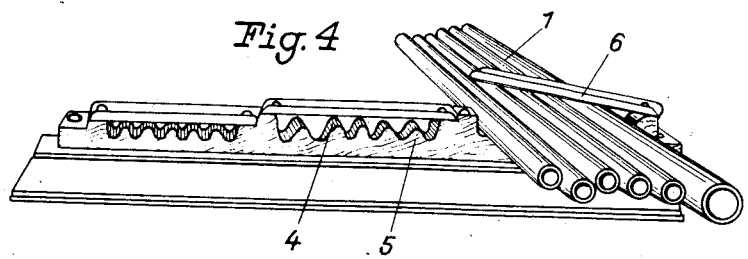
Figure 4 is a perspective view showing one of the spacing members and some of the pipes being mounted thereon.

Referring first to Figures 1 to 4 of the drawings, 10 denotes a fixture or construction frame upon which a carrier means is secured for subsequent detachment after the various parts which form the assembly have been assembled upon the carrier means and are held thereby in their required spaced relation.

In this case the carrier means consists of a plurality of separate spacing members 5 having outwardly stepped extremities through which apertures 13 are formed for the passage of removable fastening means therethrough for temporary attachment of the member to the fixture 10. The various parts of the assembly, consisting in this case of pipes 1 and their fittings and connections, are cut, shaped and connected as required and placed to extend through depressions 4 formed in the members by which they are supported in their required relative positions to one another.

A clamping bar 6 is then secured upon each member 5. This form of assembly is permitted by the fact that the pipes 1 and their fittings and connections are strong enough to retain the members 5 at their correct spacing after removal of the latter from the fixture 10. Thus a rigid assembly unit has been made the transportation of which may be safely undertaken without fear of displacement of any of the parts. The unit is, after its removal from the fixture, moved into the chamber wherein it is to be installed, such as the chamber 12.

If the members 5 are to form a permanent part of the assembly they may be employed as mounting means, in which case fastening means may be inserted through the apertures 13 to secure the unit in position in the chamber 12. Thus it will be seen that the assembly has been more conveniently accomplished, and the necessity for working in the cramped confines of the chamber 12 has been to a very large extent obviated.

Figure 5:
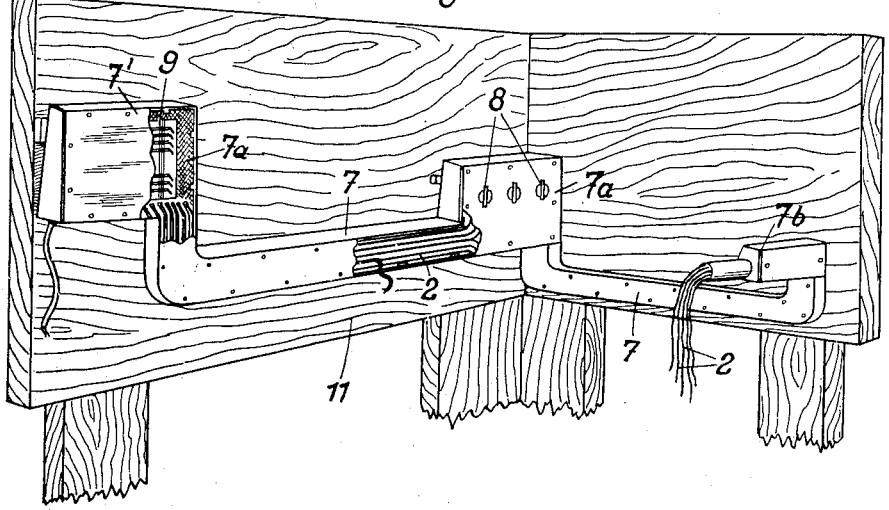
Figure 5 is a perspective view showing a modified arrangement comprising a fixture whereon the carrier means consists of a continuous rigid conduit to support the equipment.
Figure 6:
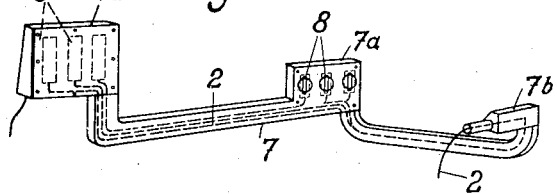
Figure 6 is a perspective view of the assembly shown in Figure 5 after its removal from the fixture.
Figure 7:
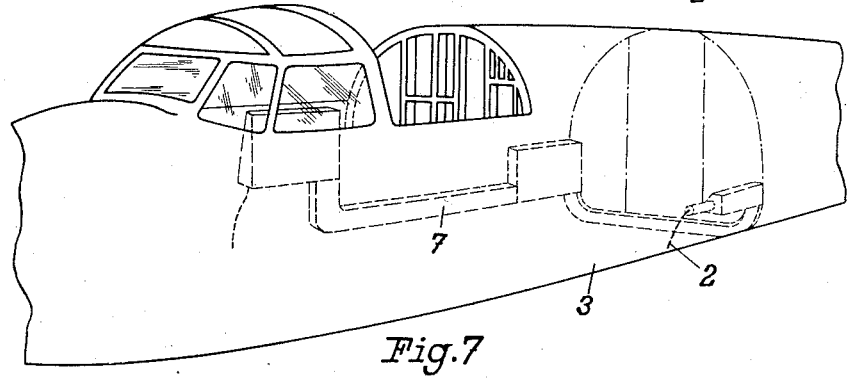
Figure 7 is a perspective view of a portion of an airplane the assembly shown in Figure 6 being indicated in a chamber formed in the airplane portion.

Referring now to Figures 5 to 7. The carrier means, again temporarily mounted upon a fixture 11, consists of a continuous rigid conduit comprising, in the present case, conductor troughs 7, junction boxes 7a and an outlet 7b. These parts 7, 7a and 7b are all rigidly connected to one another to form a continuous conduit of sufficient strength to retain its shape after removal from the fixture 11 and when the required parts have been mounted and assembled therein.

Wires 2 are mounted in the troughs 7, and such parts as switches 8 and connectors 9 are mounted in the boxes 7a. The wires 2 are also connected to the parts to form the desired circuits. Some of the wires 2 also extend through the outlet 7b for subsequent attachment to other wires—not shown—after the conduit has been secured in position in its chamber 3. Covers 7' are then secured upon the boxes 7a and outlet 7b and the conduit is detached from the fixture 11 and transported into the chamber 3 as a rigid unit and is installed in position therein. Thus in this case again it will be seen that the assembly has been materially simplified by permitting the work to be done outside instead of inside the chamber 3.

While in the foregoing two instances of the utilization of the method have been described and shown it is understood that the method may be employed for various modified forms of assemblies which are now usually made within the limited space afforded in many small airplane chambers.

What we claim is:

A method of assembling and installing bendable conductor or tube elements of substantially self-sustaining rigidity in a chamber to which working access is difficult comprising the steps of mounting a plurality of independent rigid carrier means for subsequent detachment upon a rigid fixture at spaced points positioned relative to one another in substantial conformity with the ultimately desired course of said elements, bending the elements to conform to such course, securing the same to the carrier means to form a unit therewith, detaching the carrier means from the fixture, and positioning the resultant substantially self-sustaining composite unit in the chamber.

PAUL RÖHR.
FRANZ SCHRÖTER.
WERNER HOFMANN.
JOHANN HASELOFF.
BRUNO STÄRKE.